US008353275B2

(12) United States Patent
VanDerWege et al.

(10) Patent No.: US 8,353,275 B2
(45) Date of Patent: Jan. 15, 2013

(54) DUAL THROTTLE FOR IMPROVED TIP-OUT STABILITY IN BOOSTED ENGINE SYSTEM

(75) Inventors: Brad Alan VanDerWege, Canton, MI (US); Ralph Wayne Cunningham, Milan, MI (US); Ross Dykstra Pursifull, Dearborn, MI (US); Gopichandra Surnilla, West Bloomfield, MI (US); John David Russell, Portland, OR (US)

(73) Assignee: Ford Global Technologies, LLC, Dearborn, MI (US)

( * ) Notice: Subject to any disclaimer, the term of this patent is extended or adjusted under 35 U.S.C. 154(b) by 584 days.

(21) Appl. No.: 12/684,353

(22) Filed: Jan. 8, 2010

(65) Prior Publication Data
US 2011/0168143 A1 Jul. 14, 2011

(51) Int. Cl.
*F02M 25/07* (2006.01)
*F02B 47/08* (2006.01)
*F02B 33/44* (2006.01)
*F02B 29/04* (2006.01)
*F02D 23/00* (2006.01)
(52) U.S. Cl. ............... 123/568.12; 123/568.15; 60/278; 60/599; 60/600; 60/605.2; 60/611
(58) Field of Classification Search ............ 123/568.12, 123/568.15, 568.21, 585, 586; 701/103, 701/108; 60/278, 279, 599–602, 605.2, 611
See application file for complete search history.

(56) References Cited

U.S. PATENT DOCUMENTS

| 4,313,406 A | * | 2/1982 | Iizuka et al. ............... 123/198 F |
| 4,489,688 A | | 12/1984 | Ito et al. |
| 4,512,152 A | | 4/1985 | Asaba |
| 4,716,734 A | | 1/1988 | Nakao et al. |
| 5,203,311 A | * | 4/1993 | Hitomi et al. .............. 60/605.2 |
| 5,269,144 A | | 12/1993 | Miller et al. |
| 5,279,273 A | | 1/1994 | Nakata et al. |
| 5,355,677 A | | 10/1994 | Hawkins et al. |
| 5,785,030 A | | 7/1998 | Paas |
| 5,974,802 A | * | 11/1999 | Blake ........................ 60/605.2 |
| 6,209,324 B1 | * | 4/2001 | Daudel et al. .............. 60/605.2 |
| 6,470,682 B2 | | 10/2002 | Gray, Jr. |
| 6,484,703 B1 | * | 11/2002 | Bailey ..................... 123/568.15 |
| 7,066,158 B2 | | 6/2006 | Kuzuyama |
| 7,322,192 B2 | | 1/2008 | Sheidler et al. |
| 8,056,339 B2 | * | 11/2011 | Lippa et al. ................ 60/605.2 |
| 8,230,675 B2 | * | 7/2012 | Pursifull et al. ............ 60/278 |
| 2005/0000497 A1 | | 1/2005 | Nakai et al. |

FOREIGN PATENT DOCUMENTS

| JP | 55084841 A | * | 6/1980 | ............ 60/605.2 |
| JP | 8121259 | | 5/1996 | |

* cited by examiner

*Primary Examiner* — Willis R Wolfe, Jr.
(74) *Attorney, Agent, or Firm* — Julia Voutyras; Alleman Hall McCoy Russell & Tuttle LLP

(57) ABSTRACT

A method for providing intake air to an engine in a vehicle includes forming a mixture of fresh air and treated exhaust, and compressing the mixture upstream of a first throttle valve coupled to an intake manifold of the engine. The method further includes, during a higher engine-load condition, admitting the mixture to the intake manifold via the first throttle valve, and, during a lower engine-load condition, admitting fresh air to the intake manifold via a second throttle valve.

20 Claims, 9 Drawing Sheets

DUAL THROTTLE FOR IMPROVED TIP-OUT STABILITY IN BOOSTED ENGINE SYSTEM

TECHNICAL FIELD

The present application relates to improving fuel economy and reducing emissions in motor vehicles, and more particularly, to enacting exhaust-gas recirculation in boosted engine systems.

BACKGROUND AND SUMMARY

A boosted engine may exhibit higher combustion and exhaust temperatures than a naturally aspirated engine of similar output power. Such elevated temperatures may contribute to increased nitrogen-oxide (NOX) emissions and may accelerate materials ageing in the engine system, including exhaust-after treatment catalyst ageing. Exhaust-gas recirculation (EGR) is a popular strategy for combating these effects. EGR works by delivering exhaust gas having reduced oxygen content to the intake, which results in lower combustion and exhaust temperatures. In particular, EGR variants that deliver cooled EGR are desirable because they can supply a relatively large flow of exhaust gas to the intake. However, cooled EGR is liable to cause transient control difficulties in boosted engine systems, particularly in combination with spark-ignition. For instance, throttle closure in a system configured for cooled EGR may trap a significant volume of compressed, EGR-diluted air upstream of the throttle. Such trapping may occur on transitioning from high to low engine load, for example. Under low-load, closed-throttle conditions, however, the engine may require fresh air to sustain combustion. Opening a compressor by-pass valve at this time provides a partial, but incomplete remedy for the problem, as the EGR-diluted air remains upstream of the throttle, albeit at a lower absolute pressure.

Other approaches have targeted transient control issues in engine systems having cooled EGR. For example, U.S. Pat. No. 6,470,682 to Gray, Jr. provides a base intake manifold through which air and cooled LP EGR are provided to a diesel engine, and, an additional intake manifold that supplies only fresh air to the engine. The additional intake manifold is sourced by a fast-acting, electrically driven air compressor. When torque demand increases rapidly, the fast-acting compressor is switched on, displacing the existing mixture of air and EGR in the base intake manifold and providing increased oxygen mass to the engine, for increased torque. However, this system is particular to diesel engines, which may be unthrottled, and may tolerate significant amounts of EGR even at idle. Thus, the particular transient-control issues addressed in the reference differ from those experienced in spark-ignition engines.

The inventors herein have recognized that improved transient control in an EGR equipped engine system can be achieved by delivering boosted, EGR-diluted air and fresh air through separate throttle valves. In one embodiment, therefore, a method for providing intake air to an engine in a vehicle comprises forming a mixture of fresh air and treated exhaust, and compressing the mixture upstream of a first throttle valve coupled to an intake manifold of the engine. The method further comprises, during a higher engine-load condition, admitting the mixture to the intake manifold via the first throttle valve, and, during a lower engine-load condition, admitting fresh air to the intake manifold via a second throttle valve. In this manner, pressurized, EGR-diluted air remains trapped behind the first throttle valve, thereby alleviating at least some transient-control difficulties associated with cooled EGR.

Another method for providing intake air to an engine in a vehicle comprises delivering compressed fresh air and EGR to the engine via first and second throttle valves coupled to an intake manifold of the engine. During a higher engine-load condition, an EGR exhaust flow is cooled in a heat exchanger and the cooled EGR exhaust flow is admitting to the intake manifold. During a lower engine-load condition, fresh air is warmed in the heat exchanger, and the warmed fresh air is admitted to the intake manifold. In this manner, the heat exchanger serves double duty, abating knock at high engine load, and providing other advantages at low engine load. In particular, in the low-load region of the engine map the intake air can be heated to a significant degree without inducing knock; such heating reduces the density of the gas in the intake manifold with little or no reduction in inlet air pressure. Besides reducing pumping losses, increased intake air temperature may improve combustion reliability and increase EGR tolerance.

DETAILED DESCRIPTION

The subject matter of the present disclosure is now described by way of example and with reference to certain illustrated embodiments. Components that may be substantially the same in two or more embodiments are identified coordinately and are described with minimal repetition. It will be noted, however, that components identified coordinately in different embodiments of the present disclosure may be at least partly different. It will be further noted that the drawings included in this disclosure are schematic. Views of the illustrated embodiments are generally not drawn to scale; aspect ratios, feature size, and numbers of features may be purposely distorted to make selected features or relationships easier to see.

Figure 1:
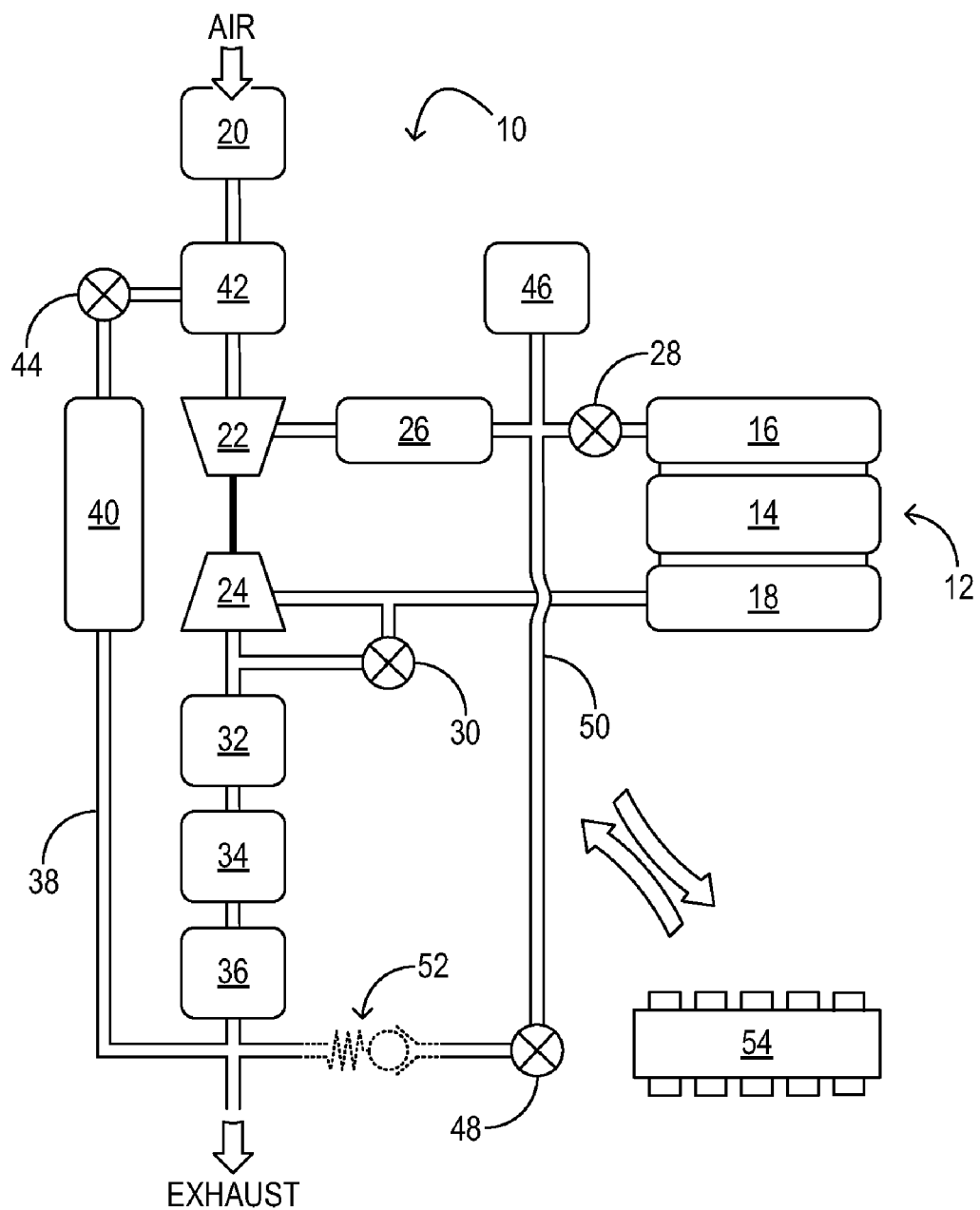
FIGS. 1-4 show aspects of systems configured to provide intake air to an engine in a vehicle, in accordance with different embodiments of the present disclosure.

FIG. 1 shows aspects of a first example system 10 configured to provide intake air to an engine 12 in a vehicle. The engine includes a plurality of combustion chambers 14, each coupled to intake manifold 16 and to exhaust manifold 18. In the combustion chambers, combustion may be initiated via spark ignition and/or compression ignition in any variant. Further, the engine may be configured to consume any of a variety of fuels: gasoline, alcohols, diesel, biodiesel, compressed natural gas, etc. The fuel may be supplied to the combustion chambers via direct injection, port injection, or any combination thereof.

System 10 is configured to supply compressed intake air to engine 12 during certain operating conditions. Accordingly, fresh air enters the system via air cleaner 20 and flows to compressor 22. The compressor may be any suitable intake-air compressor—a drive-shaft driven or motor-driven supercharger compressor, for example. In the embodiment shown in FIG. 1, the compressor is a turbocharger compressor mechanically coupled to turbine 24, the turbine driven by expanding engine exhaust from exhaust manifold 18. From compressor 22, compressed intake air flows through intercooler 26 en route to throttle valve 28. The intercooler may be any suitable heat exchanger configured to cool the intake air for desirable combustion properties.

As noted above, exhaust from exhaust manifold 18 flows to turbine 24 to drive the turbine. When reduced turbine torque is desired, some exhaust may be directed instead through waste gate 30, by-passing the turbine. The combined flow from the turbine and the waste gate then flows through exhaust-aftertreatment devices 32, 34, and 36. The nature, number, and arrangement of the exhaust-aftertreatment devices may vary in the different embodiments of the present disclosure. In general, the exhaust-aftertreatment devices may include at least one exhaust-aftertreatment catalyst configured to catalytically treat the exhaust flow, and thereby reduce a concentration of one or more substances in the exhaust flow. For example, one exhaust-aftertreatment catalyst may be configured to trap nitrogen oxides (NOX) from the exhaust flow when the exhaust flow is lean, and to reduce the trapped NOX when the exhaust flow is rich. In other examples, an exhaust-aftertreatment catalyst may be configured to disproportionate NOX, or, to selectively reduce NOX with the aid of a reducing agent. In other examples, an exhaust-aftertreatment catalyst may be configured to oxidize residual hydrocarbons and/or carbon monoxide in the exhaust flow. Different exhaust-aftertreatment catalysts having any such functionality may be arranged in wash coats or elsewhere in the exhaust-aftertreatment devices, either separately or together. In some embodiments, the exhaust-aftertreatment devices may include a regenerable soot filter configured to trap and oxidize particulates in the exhaust flow.

Continuing in FIG. 1, part of the treated exhaust flowing from exhaust-aftertreatment devices 32, 34, and 36 is released into the ambient. However, the balance of the treated exhaust is drawn into EGR conduit 38 and flows through EGR cooler 40. The EGR cooler may be any suitable heat exchanger configured to cool the treated exhaust flowing through the EGR conduit to temperatures suitable for mixing into the intake air. System 10 further includes variable venturi 42 coupled between air cleaner 20 and compressor 22. The variable venturi draws treated exhaust from the EGR conduit, and mixes the treated exhaust into the fresh air flowing in from the air cleaner. In one embodiment, the variable venturi may be configured to conduct the fresh air axially through an expansion chamber, in which a partial vacuum caused by the expanding flow draws in the treated exhaust through an eccentric inlet. Meanwhile, the amount of treated exhaust available for mixing into the fresh air is regulated via EGR valve 44. A mixture of fresh air and treated exhaust may be provided, accordingly, as intake air to the inlet of the compressor.

FIG. 1 shows pressure sensor 46 coupled to the upstream side of throttle valve 28. The pressure sensor may be one of a plurality of sensors (pressure sensors, temperature sensors, etc.) coupled throughout the engine system. The pressure sensor may be configured to provide an output responsive to the air pressure at the upstream side of the throttle valve, i.e., the throttle inlet pressure (TIP). Under some operating conditions, it may be desirable to abruptly reduce TIP. Such conditions may include, for example, full or partial closure of the throttle valve. Accordingly, FIG. 1 shows release valve 48 coupling the upstream side of the throttle valve to the downstream side of exhaust-aftertreatment device 36, via release conduit 50. As shown in FIG. 1, the release valve may be coupled to the downstream side of exhaust-aftertreatment device 36 via an optional check valve 52. In one embodiment, the release valve may be a two-state valve having an open position and a closed position. In other embodiments, however, the release valve may admit of a variable (e.g., continuously adjustable) degree of opening.

In some embodiments check valve 52 may be included to prevent exhaust from flowing through release valve 48 to throttle valve 28 under conditions of low TIP. In other embodiments, however, such exhaust flow may be desired under appropriate operating conditions. Thus, check valve 52 may be omitted in certain embodiments, and release valve 48 may be used to regulate a flow of exhaust (i.e., EGR) to the upstream side of throttle valve 28. Accordingly, a second EGR cooler (not shown in the drawings) may be disposed between the release valve and the throttle valve and configured to cool the treated exhaust flowing through release conduit 50. In still other embodiments, the release conduit may be coupled to the upstream side of intercooler 26 instead of the downstream side, allowing the EGR to be cooled via the intercooler instead of a second EGR cooler.

In some embodiments, throttle valve 28, waste gate 30, EGR valve 44, and/or release valve 48 may be electronically controlled valves configured to close and open at the command of an electronic control system. Further, one or more of these valves maybe continuously adjustable. Accordingly, FIG. 1 shows electronic control system 54, which may be any electronic control system of the vehicle in which system 10 is installed. The electronic control system may be operatively coupled to each of the electronically controlled valves and configured to command their opening, closure, and/or adjustment as needed to enact any of control functions described herein. In one embodiment, the electronic control system may be configured to open the release valve in response to a closure of the throttle valve, and to close the release valve when TIP falls below a threshold value, as further described below. To this end, the electronic control system may be operatively coupled to various sensors arranged throughout the illustrated system—temperature sensors, pedal-position sensors, pressure sensors, etc., including pressure sensor 46.

Various advantages of the approaches described herein are best understood in contrast to existing compressor-control configurations, which, upon throttle closure, reduce TIP by venting pressurized intake air from upstream of the throttle valve back to the compressor inlet via a compressor by-pass valve. Should such venting occur when the engine has been operating at a significant EGR ratio, exhaust gas present upstream of the throttle valve before venting will remain at the same ratio after venting, albeit at a lower absolute pressure. However, sustained combustion under closed-throttle conditions will typically require fresh intake air having little or no EGR. Therefore, the existing configurations may be prone to combustion instability in this common scenario.

The embodiment shown in FIG. 1 overcomes the disadvantage noted above by allowing pressurized intake air to be discharged into the exhaust flow instead of the compressor inlet. In this manner, intake air upstream of throttle valve 28 is effectively purged of exhaust gas, and is replaced by fresh air from air cleaner 20. Such fresh air reliably supports combustion under low engine-load (e.g., closed-throttle) conditions.

The inventors herein have recognized, however, that releasing intake air into the exhaust flow, even when diluted significantly by EGR, could adversely affect exhaust-aftertreatment catalysts arranged in the exhaust flow. Therefore, the embodiment shown in FIG. 1 provides that the compressed mixture of fresh air and treated exhaust may be released downstream of exhaust-aftertreatment devices 32, 34, and 36. To avoid discharge of untreated exhaust to the ambient during the release, the embodiment also provides that the EGR is drawn from the exhaust flow downstream of the exhaust-aftertreatment devices. In embodiments where such exhaust-aftertreatment devices include a soot filter, it is further provided that the EGR will not entrain excessive amounts of soot, which could potentially damage compressor 22 and EGR cooler 40. It will be further noted that the embodiment shown in FIG. 1 overcomes the disadvantages of existing configurations using the same number of electronically controlled valves as found in the existing configurations: release valve 48 merely replaces the compressor by-pass valve.

FIG. 1 illustrates one of many embodiments contemplated herein; related embodiments, fully consistent with the present disclosure, may be configured differently. For example, some embodiments may include a high-pressure exhaust-gas recirculation (HP EGR) path in addition to the illustrated LP EGR path. Still other embodiments may lack variable venturi 42, and may provide alternative componentry for mixing EGR into the inlet air flow.

Figure 2:
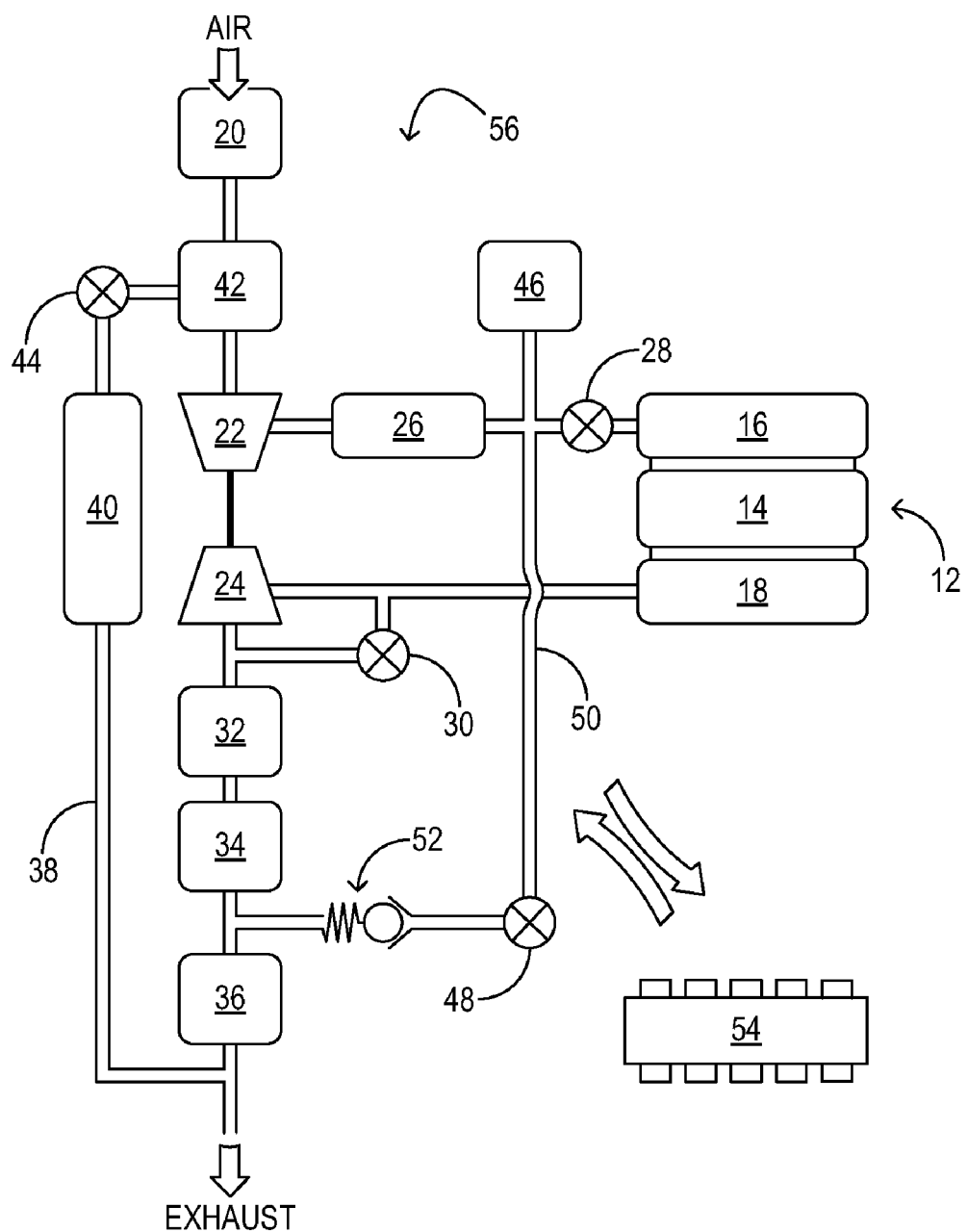

FIG. 2 shows aspects of a second example system 56 configured to provide intake air to an engine 12 in a vehicle. System 56 differs from system 10 in that unwanted EGR is here released upstream of exhaust-aftertreatment device 36, which may be a regenerable soot filter. This configuration offers an advantage in that the release of unwanted EGR may, under some conditions, be coordinated with oxidative regeneration of the soot filter. In particular, an excess quantity of compressed air may be delivered to the soot filter to support such regeneration, while more upstream exhaust-aftertreatment catalysts (32 and 34, for example) continue to operate under stoichiometric conditions.

Figure 3:
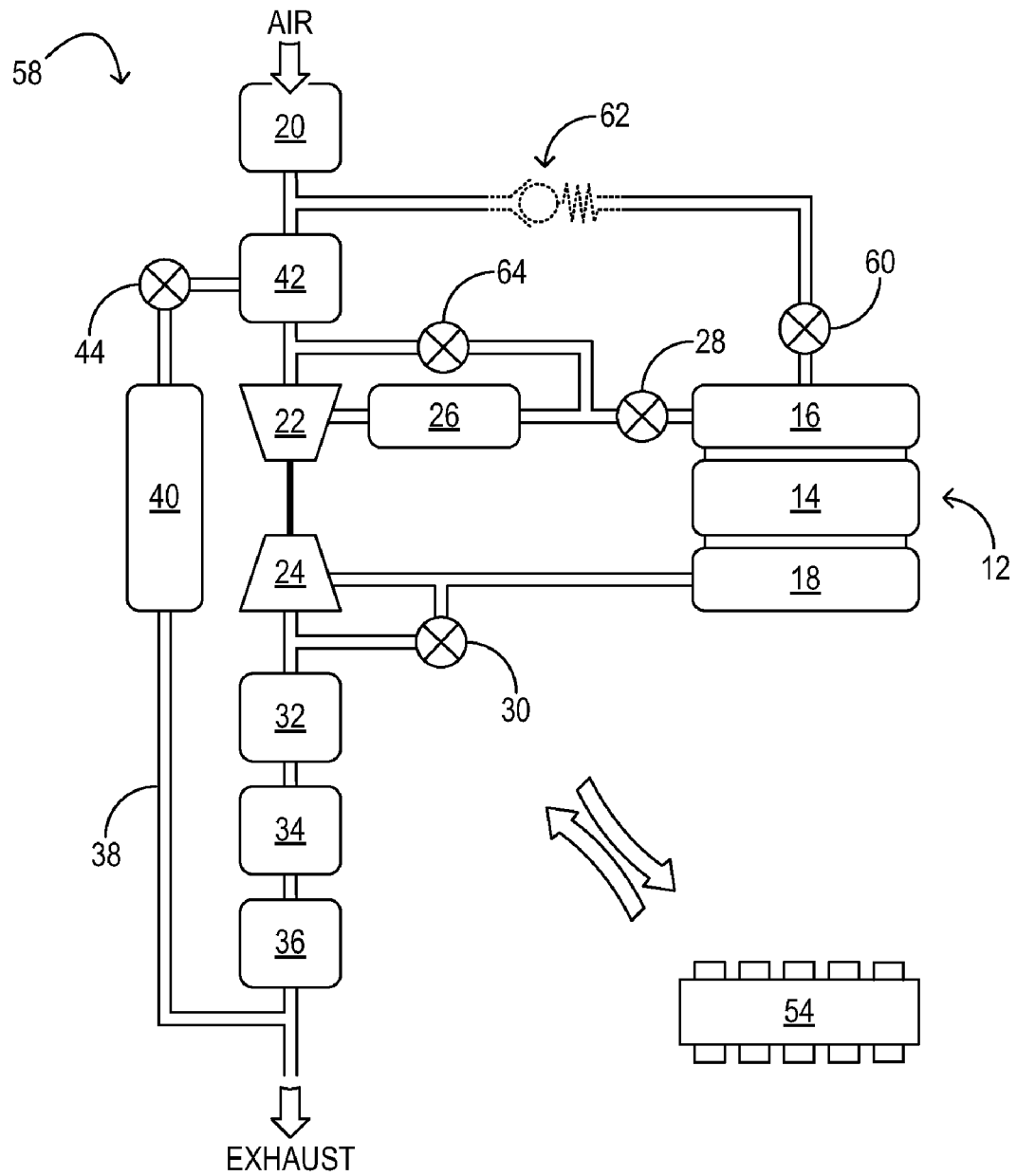

FIG. 3 shows aspects of a third example system 58 configured to provide intake air to an engine 12 in a vehicle. In the embodiment shown in FIG. 3, air is supplied to intake manifold 16 via first throttle valve 28, as described in the previous embodiment, and via second throttle valve 60. The first and second throttle valves may be coupled directly to the intake manifold, as shown in the drawing, or coupled indirectly via any suitable componentry. Depending on operating conditions, the first throttle valve may regulate a flow of boosted air and/or air containing EGR. Meanwhile, the second throttle valve regulates a flow of uncompressed, fresh air from air cleaner 20 to intake manifold 16.

As in the previous embodiment, electronic control system 54 may be operatively coupled to various engine system sensors, including a manifold air-pressure sensor or other sensor configured to determine engine torque or any quantity responsive to changing engine load. Thus, by appropriate operative coupling to controller 54, the first throttle valve may be configured to open during a higher engine-load condition to admit boosted and/or EGR-containing air to intake manifold 16. Likewise, the second throttle valve may be configured to open during a lower engine-load condition to admit fresh air to the intake manifold. In this manner, the configuration shown in FIG. 3 provides another approach to maintaining combustion stability during abrupt engine-load reduction in a boosted engine system. In particular, abrupt reduction in engine load may trigger a closure of first throttle valve 28, thus trapping unwanted EGR behind the first throttle valve. Such engine-load reduction may be revealed by a corresponding reduction in MAP, for example. During this condition, undiluted fresh air may be delivered to the engine via second throttle valve 60, to reliably support combustion.

In one embodiment, first throttle valve 28 and second throttle valve 60 may be substantially the same. They may be state-of-the-art, electronically actuated throttle valves. In other embodiments, the first and second throttle valves may be at least partly different. For example, the second throttle valve may be an idle air by-pass valve (IABV) variant configured to withstand greater-than-normal air flows and/or back pressure. As such, the second throttle valve may be configured for relatively fine control of the air flow, as may be required during idle conditions and thereabouts. By controlling air flow via the second throttle valve during conditions where relatively fine air-flow control is needed, a lesser control precision of the first throttle valve may be tolerated. In one embodiment, —accordingly, the first throttle valve may include a bore having a relatively large cross section, which is advantageous for controlling air flow during high-load conditions, where a relatively large flow of boosted air and EGR may be inducted into the engine.

In one embodiment, second throttle valve 60 may be held closed during boosted conditions to prevent depressurization of the intake manifold and reverse flow through air cleaner 20. In other embodiments, as shown in FIG. 3, optional check valve 62 may be coupled in series with the second throttle valve to passively prevent such depressurization.

In another embodiment, backflow through second throttle valve 60 may be reduced by keeping the length of the conduit between the second throttle valve and venturi 42 relatively short, such that any backflow—including backflow containing EGR—will be swept into the venturi. Thus, when forward flow through throttle valve 60 is desired, it will be substantially free of EGR.

Further, the embodiment illustrated in FIG. 3 provides still another advantage, in that the EGR trapped behind the first throttle valve, as indicated above, is not necessarily dissipated immediately at TIP out, but may remain available, i.e., stored, for uptake during subsequent TIP in.

Continuing in FIG. 3, system 58 shows compressor by-pass valve 64 configured to discharge excess compressed intake air upstream of first throttle valve 28 back to the inlet of compressor 22. Electronic control system 54 may command the by-pass valve to open during a reduction of engine load, for example. It will be understood, however, that other embodiments fully consistent with this disclosure may include a release valve coupled as shown in the previous embodiments (e.g., FIG. 1, release valve 48).

It will be understood that no aspect of FIG. 3 is intended to be limiting. For example, EGR may be drawn from downstream of exhaust-aftertreatment device 36, as shown in FIG. 3, or, it may be drawn from upstream of any of the exhaust-aftertreatment devices of engine system 58.

Figure 4:
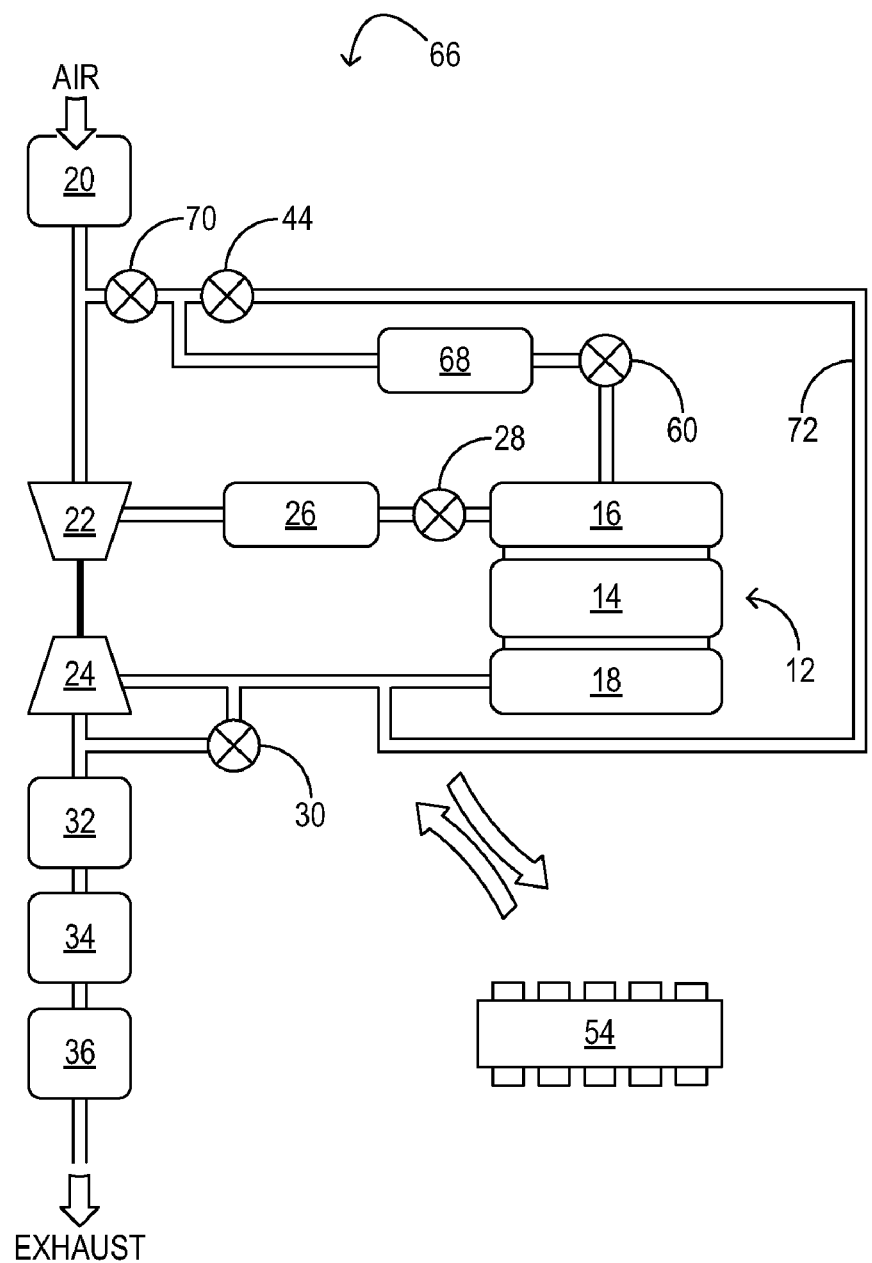

FIG. 4 shows aspects of a fourth example system 66 configured to provide intake air to an engine 12 in a vehicle. System 66 includes heat-exchanger 68, which may be any passive device suitable for adjusting a temperature of a gas flowing therethrough. The drawing shows intake manifold 16 coupled directly to first throttle valve 28 and second throttle valve 60. In other embodiments, the first and second throttle valves may be coupled to the intake manifold indirectly, via any suitable componentry. As shown in FIG. 4, the outlet of the heat exchanger is coupled to the intake manifold via second throttle valve 60. Accordingly, the heat exchanger may be configured to adjust the temperature of the gas to enable desirable combustion performance in engine 12. Warming and cooling the gas are both enabled and may be enacted in the same system during different operating conditions, as further described below.

During conditions of relatively high engine load, the gas inside heat exchanger 68 may comprise EGR destined for delivery to the engine intake; accordingly, the heat exchanger may be adapted to lower the temperature of the EGR, thereby serving as an EGR cooler. During conditions of relatively low engine load, the gas inside the heat exchanger may comprise fresh air, also destined for delivery to the engine intake; accordingly, the heat exchanger may be adapted to raise the temperature of the fresh air, thus serving as an intake air heater. Intake-air heating may improve the overall efficiency of the engine under light-load conditions by decreasing pumping losses, for example.

In one embodiment, heat exchanger 68 may conduct air and EGR through a gas conduit, and may also conduct a liquid through a liquid conduit. The gas and liquid conduits may be thermally coupled but fluidically isolated from each other. In one embodiment, engine coolant may be conducted through the liquid conduit. Accordingly, the heat exchanger may be configured to conduct heat from the EGR flow to the engine coolant during the higher engine-load condition, and to conduct heat from the engine coolant to a fresh air flow during the lower engine-load condition.

Continuing in FIG. 4, system 66 shows control valve 70, which is operatively coupled to electronic control system 54. As indicated with respect to the previous embodiments, the electronic control system may be operatively coupled to various engine system sensors responsive to changing engine load. Accordingly, under higher engine-load conditions, where EGR and boost are desired, control valve 70 may be held closed and EGR valve 44 may be held open. In the illustrated configuration, closing the control valve and opening the EGR valve causes EGR to flow from EGR conduit 72 through heat exchanger 68 and simultaneously blocks the flow of fresh air to the heat exchanger. Under these conditions, compressor 22 receives and compresses a flow of fresh air, and delivers the compressed fresh air flow to first throttle valve 28. Further, the EGR valve regulates and delivers an EGR flow to second throttle valve 60. Cooled, EGR is thereby provided to intake manifold 16 via the second throttle valve, while fresh air from air cleaner 20 is provided, compressed and cooled, to the intake manifold via the first throttle valve. Thus, the first throttle valve is used to meter compressed, fresh air, and the second throttle valve is used to meter EGR.

Under conditions where neither EGR nor boost are desired, control valve 70 may be held open, and EGR valve 44 may be held closed. Opening the control valve and closing the EGR valve allows fresh air to flow through heat exchanger 68, and simultaneously blocks admission of EGR to the engine intake. Warmed, fresh air is thereby provided to intake manifold 16 via second throttle valve 60, while first throttle valve 28 is held closed. In this manner, the second throttle valve may be used to meter air flow into engine 12.

The embodiment illustrated in FIG. 4 provides still other advantages. During TIP-out conditions, when a significant amount of unwanted, compressed intake air may be trapped upstream of first throttle valve 28, opening first throttle valve 28, second throttle valve 60, and control valve 70 provides a blow-off mechanism for compressor 22. In this manner, excess boost pressure may be routed back to the compressor inlet when EGR valve 44 is closed.

No aspect of FIG. 4 is intended to be limiting, for numerous related embodiments are contemplated. For example, while a single heat exchanger 68 may be used to cool EGR and to warm intake air, these functions may, in other embodiments, be accomplished via separate, coupled or uncoupled heat exchangers. Further, either or both of the heat exchangers may use air instead of, or in addition to engine coolant, as a medium to which heat from the EGR is transferred.

In contrast to the engine systems of FIGS. 1-3, which provide cooled low-pressure EGR, the configuration shown in FIG. 4 also provides cooled high-pressure EGR. It will be understood, however, that this embodiment may be combined, generally, with suitable low-pressure EGR approaches in the same engine system. Such integrated low- and high-pressure EGR systems may include aspects of the embodiments shown in FIGS. 1-3 and described hereinabove. In a system that supports both a low-pressure and a high-pressure EGR path, two EGR valves may be included, with each valve configured to open during a predetermined higher engine-load condition. Further, the particular conditions that trigger the opening of the first EGR valve may differ from those that trigger the opening of the second EGR valve.

The configurations illustrated above enable various methods for providing intake air to an engine in a vehicle. Accordingly, some such methods are now described, by way of example, with continued reference to the above configurations. It will be understood, however, that the methods here described, and others fully within the scope of the present disclosure, may be enabled via other configurations as well.

Figure 5:
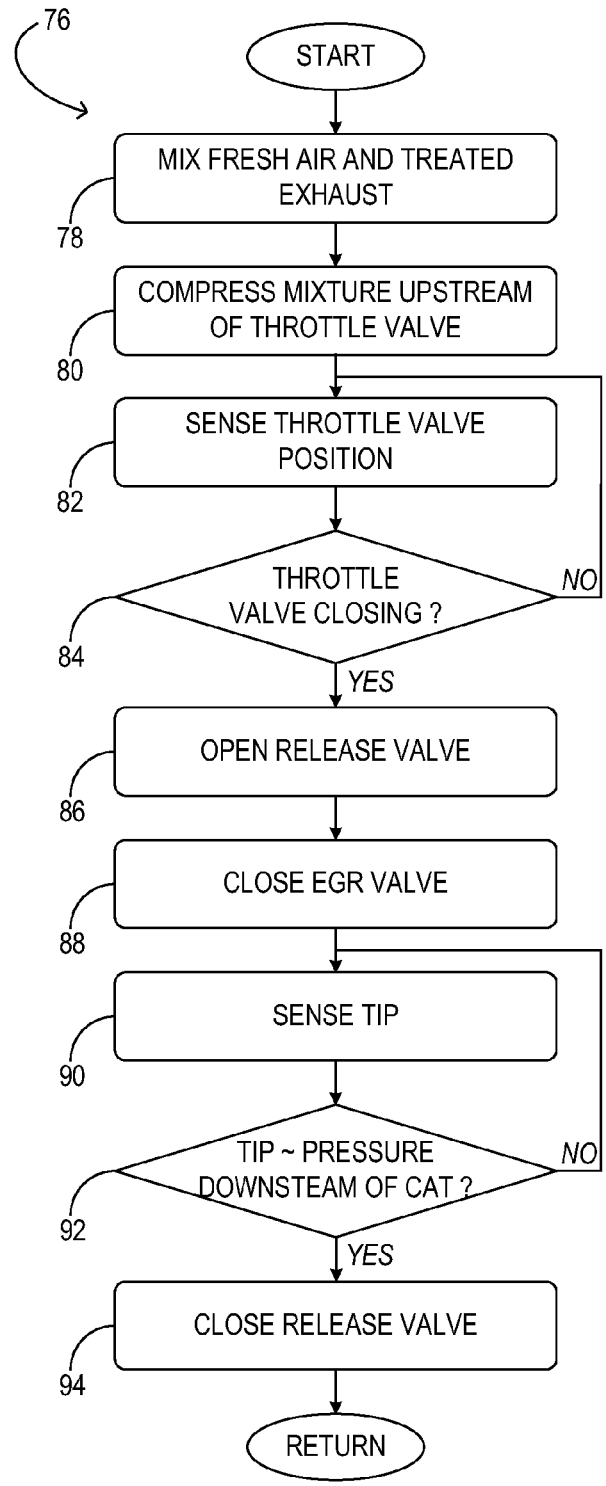
FIGS. 5-9 illustrate methods for providing intake air to an engine in a vehicle, in accordance with different embodiments of the present disclosure.

FIG. 5 illustrates a first example method 76 for providing intake air to an engine in a vehicle. The method may be enacted via an electronic control system (e.g., electronic control system 54) coupled to one or more sensors and electronically controlled valves, as described above. For example, method 76 may be enabled via the configuration shown in FIG. 1.

Method 76 begins at 78, where a mixture of fresh air and treated exhaust is formed. The treated exhaust may be drawn from an exhaust flow of the engine downstream of an exhaust-aftertreatment catalyst, and, in some embodiments, a soot filter. The mixture may be formed by flowing the fresh air through a variable venturi, and admitting the treated exhaust to an eccentric inlet of the variable venturi from an EGR conduit, as described hereinabove.

Method 76 advances to 80, where the mixture formed at 78 is compressed and delivered upstream of a throttle valve coupled into an intake of the engine. In one embodiment, the mixture may be compressed via a turbocharger compressor. The method then advances to 82, where a position (i.e., degree of closure) of the throttle valve is sensed. The method then advances to 84, where it is determined, based in part on the position sensed at 82, whether the throttle valve is closing—whether fully closing or partially closing. If it is determined that the throttle valve is not closing, then execution of the method resumes at 82. However, if it is determined that the throttle valve is closing or is partially closing, then the method advances to 86, where the release valve is opened and held open. The release valve may be any valve switchably coupling the upstream side of the throttle valve to the downstream side of an exhaust-aftertreatment catalyst, as shown hereinabove. In this manner, in response to an increased closure (i.e., throttling) of the throttle valve, the compressed mixture of fresh air and treated exhaust accumulated upstream of the throttle valve may be discharged into the exhaust flow of the engine. In other embodiments, discharge of the compressed mixture into the exhaust flow may be correlated to full or partial closure of the throttle valve, without being enacted in response to the closure per se. Further, the particular locus of the exhaust flow where the intake air is discharged may be downstream of the exhaust-aftertreatment catalyst. In some embodiments, the inlet air may be discharged downstream of every exhaust-aftertreatment catalyst situated in the exhaust flow. In still other embodiments, the inlet air may be discharged downstream of some exhaust-aftertreatment catalysts, but upstream of a soot filter, as further described hereinafter.

Method 76 then advances to 88, where an EGR valve regulating a flow treated exhaust to the engine intake is closed. In this manner, treated exhaust is restricted from mixing with the fresh air in response to closure of the throttle valve. Method 76 then advances to 90, where the throttle inlet pressure (TIP) is sensed. In one embodiment, TIP may be sensed via a dedicated pressure sensor coupled to the upstream side of the throttle valve. The method then advances to 92, where it is determined whether TIP is within a predetermined interval of the pressure of the exhaust flow at the downstream side of an exhaust-aftertreatment catalyst. The predetermined interval may be any suitable value defined in absolute terms (5 mm Hg, 10 mm Hg, etc.) or relative to at least one of the compared pressures (+2%, +5%, etc.). In making this determination, the electronic control system may sense or merely predict the pressure of the exhaust flow—such pressure may be predicted based on a known mass air flow through the engine, for example.

If it is determined that the TIP is not yet within the predetermined interval of the pressure of the exhaust flow at the downstream side of the exhaust-aftertreatment catalyst, then execution of the method resumes at 90. However, if it is determined that TIP is within the predetermined interval, then the method advances to 94, where the release valve is closed. In this manner, the release valve may be held open until, and closed after, a pressure at the upstream side of the throttle valve and a pressure at the downstream of the exhaust-aftertreatment catalyst differ by less than a predetermined amount. Following 94, method 76 returns. Engine operation may then continue with the release valve and the EGR valve both closed until such time as the electronic control system determines that EGR may again be tolerated.

The foregoing method demonstrates that full or partial throttle closure may be used to trigger the opening of the release valve and that subsequent closure of the release valve may be responsive to decreasing TIP. In other embodiments, however, other operating conditions of the engine may be used to determine one or more of an extent of opening and a duration of opening of the release valve. Decreasing accelerator depression may be used instead of throttle closure to trigger the opening of the release valve, for example. Further, the position of the accelerator may be used to determine the degree of opening of the release valve. Moreover, the extent or duration of opening of the release valve may be based on a measured or predicted EGR ratio upstream of the throttle valve. For instance, the release valve may open wider or stay open longer when the EGR ratio is high, and may close as the EGR ratio decreases. In still other embodiments, the extent or duration of opening of the release valve may be based at least partly on engine speed—the release valve opening wider or staying open longer when the engine speed decreases to lower RPM.

Figure 6:
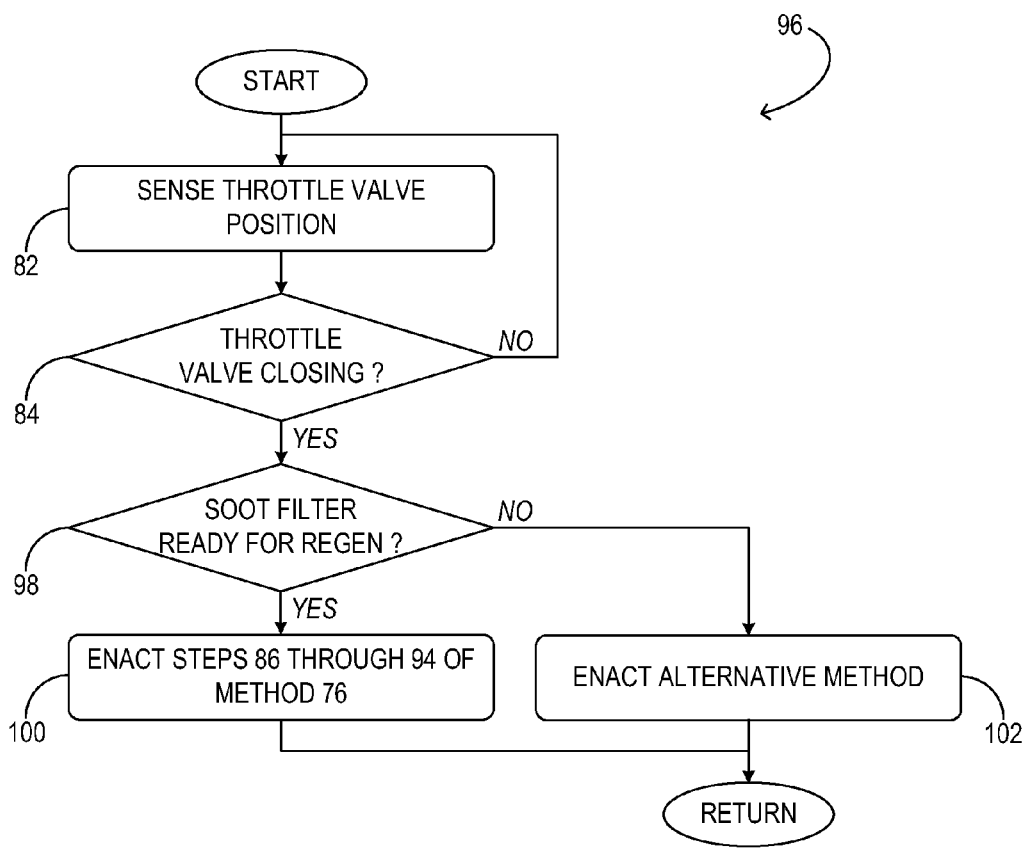

FIG. 6 illustrates a second example method 96 for providing intake air to an engine in a vehicle. The method may be enacted via an electronic control system (e.g., electronic control system 54) coupled to one or more sensors and electronically controlled valves, as described above. For example, method 96 may be enabled via the configuration shown in FIG. 2 in combination with other configurations described herein, for example.

Method 96 begins at 82, where the position of the throttle valve is sensed. The method then advances to 84, where it is determined whether the throttle valve is closing. If it is determined that the throttle valve is not closing, then execution of the method resumes at 82. However, if it is determined that the throttle valve is closing or is partially closing, then the method advances to 98, where it is determined whether a soot filter coupled in the exhaust system is ready for regeneration.

In one embodiment, the determination at 98 may be made based on a measured or predicted temperature in the exhaust system of the vehicle. For example, it may be determined that the soot filter is ready for regeneration if and only if the temperature is above a threshold, e.g., the light-off temperature of a catalytic wash coat of the soot filter. In another embodiment, the determination may be made based on a measured or predicted pressure difference between the inlet and the outlet of the soot filter. For example, it may be determined that the soot filter is ready for regeneration if the pressure difference is above a threshold. In still other embodiments, the determination at 98 may be based on a combination of these and other conditions.

Continuing in FIG. 6, if the soot filter is ready for regeneration, then the method advances to 100, where process steps 86 through 94 of method 76 (described above, illustrated in FIG. 5) are enacted. However, if it is determined that the soot filter is not ready for regeneration, then the method advances to 102, where an alternative method for delivering fresh air to the intake manifold during closed-throttle conditions is enacted. In one non-limiting embodiment, the alternative method may comprise delivering fresh air to the intake manifold via a second throttle valve, as described below.

Figure 7:
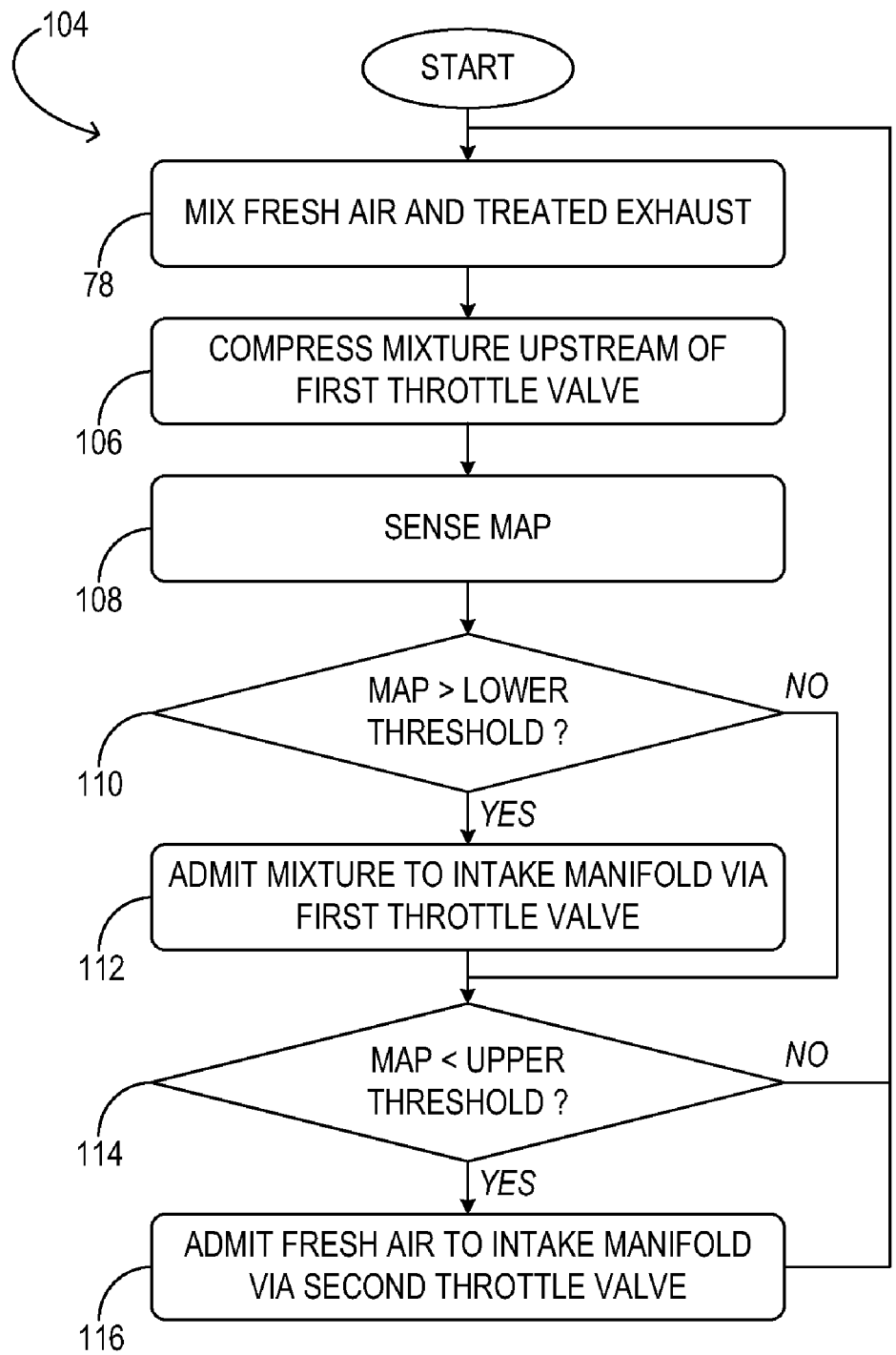

FIG. 7 illustrates a third example method 104 for providing intake air to an engine in a vehicle. The method may be enacted via an electronic control system (e.g., electronic control system 54) coupled to one or more sensors and electronically controlled valves, as described above. For example, method 104 may be enabled via the configuration shown in FIG. 3.

Method 104 begins at 78, where a mixture of fresh air and treated exhaust is formed. The fresh air may be drawn from an air cleaner, while the treated exhaust may be drawn from an exhaust flow of the engine, downstream of an exhaust-aftertreatment catalyst and downstream of a soot filter. The method then advances to 106, where the mixture of fresh air and treated exhaust is compressed. In one embodiment, the mixture may be compressed via a turbocharger compressor. The method then advances to 108, where the MAP is sensed. The MAP may be sensed via an air-pressure sensor coupled to the intake manifold, for example. At 110, it is determined whether the MAP is greater than a lower threshold. If the MAP is greater than the lower threshold, then the method advances to 112, where the mixture is admitted to the intake manifold via the first throttle valve. Whether or not the MAP is greater than the lower threshold, the method advances to 114, where it is determined whether the MAP is less than an upper threshold. If the MAP is less than the upper threshold, then the method advances to 116, where fresh air is admitted to the intake manifold via the second throttle valve. Method 104 then returns to 78.

In the engine systems considered here, the MAP may be a surrogate or predictor of engine load. More specifically, the MAP may increase as engine load increases, and decrease as engine load decreases. Accordingly, the upper and lower thresholds identified above may define three engine-load conditions: a higher engine-load condition where the mixture is admitted to the intake manifold via the first throttle valve, a lower engine-load condition where fresh air is admitted to the intake manifold via the second throttle valve, and an intermediate engine-load condition where the mixture is admitted to the intake manifold via the first throttle valve and where fresh air is admitted to the intake manifold via the second throttle valve. In this context, it will be understood that idle is a particular, limiting case of the lower engine-load condition. During idle, substantially all of the intake air provided to the engine may be drawn through the second throttle valve, i.e., the second throttle valve may function as an idle controller.

In other embodiments, the opening and/or closure of the second throttle valve may be responsive to boost level. Further, the admission of fresh air to the intake manifold may include adjusting the amount of uncompressed fresh air admitted to the intake manifold via the second throttle valve based on the boost level provided by the intake compressor. Such adjustment may, for example, include reducing an opening of the second throttle valve as the boost increases, and increasing the opening of the second throttle valve as the boost level decreases. Likewise, the overall control method by include reducing an opening of the first throttle valve as the boost decreases, and increasing the opening of the first throttle valve as the boost level increases. In one embodiment, adjusting the amount of uncompressed fresh air may include increasing the opening of the second throttle valve during TIP-out conditions of the engine. Further, the opening of the first throttle valve may be reduced on TIP-out.

In one embodiment, admitting the mixture to the intake manifold during the higher engine-load condition may comprise holding the second throttle valve closed. Conversely, admitting fresh air to the intake manifold during the lower engine-load condition may comprise holding the first throttle valve closed. During intermediate engine-load conditions, the proportion of treated exhaust relative to fresh air supplied to the engine may be determined by the relative degree of opening of the first and second throttle valves. Further, in one control embodiment, the compressor may be provided a substantially equal proportion of treated exhaust relative to fresh air during the higher, lower, and intermediate engine-load conditions.

Figure 8:
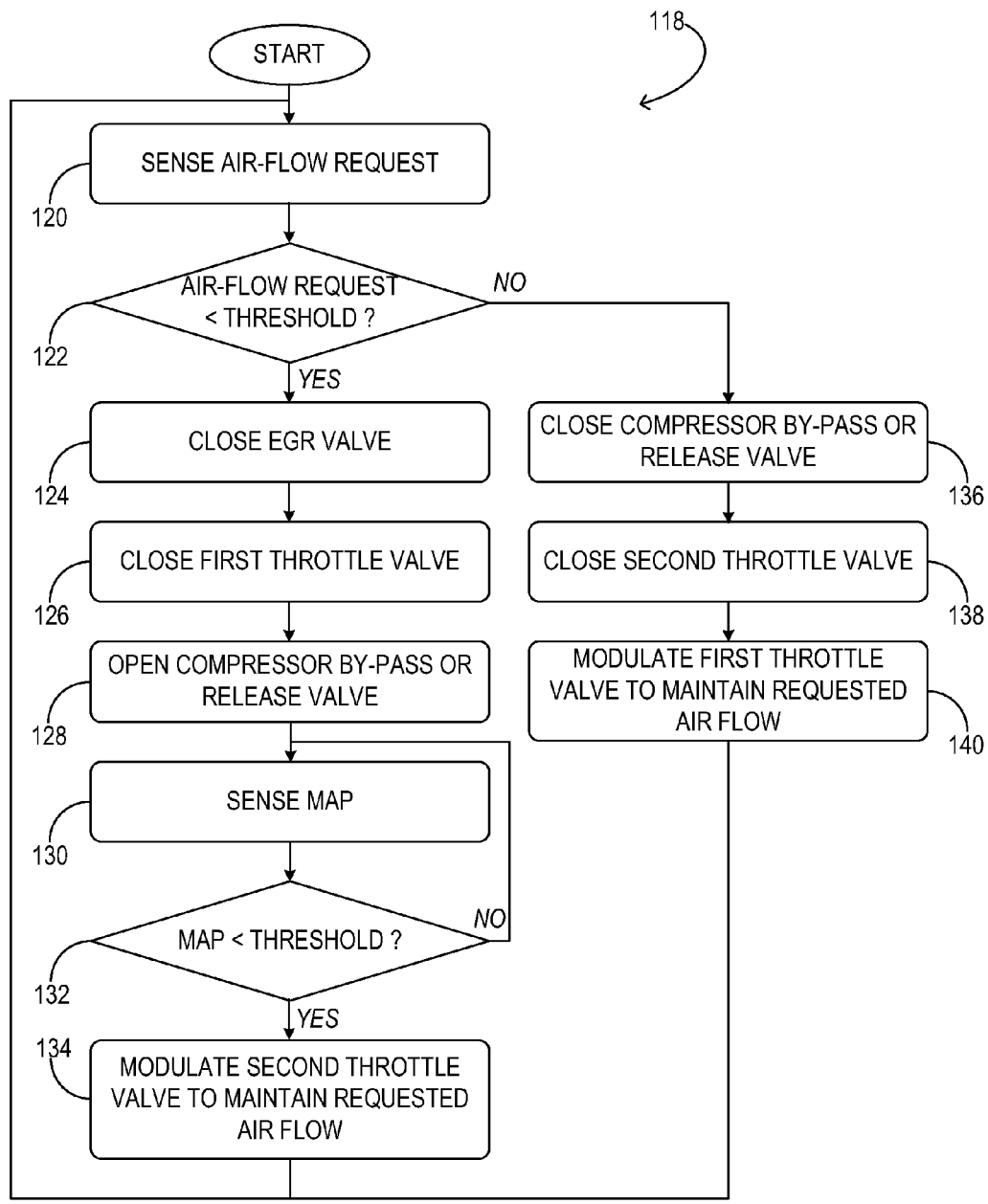

FIG. 8 illustrates a fourth example method 118 for providing intake air to an engine in a vehicle. The method may be enacted via an electronic control system (e.g., electronic control system 54) coupled to one or more sensors and electronically controlled valves, as described above. For example, method 118 may be enabled via the configuration shown in FIG. 3.

Method 118 begins at 120, where the electronic control system senses an air-flow request of the engine system. In one embodiment, the air-flow request may issue from a pedal position sensor in the vehicle. The method then advances to 122, where it is determined if the air-flow request is less than a threshold. The threshold may correspond to a minimum amount of air flow where EGR can be tolerated without sacrificing combustion performance. If it is determined that the air-flow request is less than the threshold, then the method advances to 124, where an EGR valve delivering EGR under current operating conditions is closed. The method then advances to 126, where a first throttle valve (e.g., throttle valve 28 in FIG. 3) is closed. Under some operating conditions, this action effectively traps a boosted air/EGR mixture upstream of the first throttle valve. The method then advances to 128, where a compressor by-pass or compressed-air release valve in the engine system is opened. At this point, the engine system is configured such that continued operation of the engine will pump down the pressure in the intake manifold.

Accordingly, method 118 advances to 130, where the intake manifold air pressure is sensed. The intake manifold air pressure may be sensed via a pressure sensor coupled to the intake manifold, or indirectly via a mass air-flow sensor, or in any suitable manner. The method then advances to 132, where it is determined whether the intake manifold air pressure is less than a threshold. If the intake manifold air pressure is not less than the threshold, then execution of the method resumes at 130. Otherwise, execution advances to 134, where the requested air flow is maintained by modulating a second throttle valve in the engine system (e.g., throttle valve 60 in FIG. 3).

However, if at 122 it is determined that the air flow request equals or exceeds the indicated threshold, then at 136, the compressor by-pass or release valve is closed or maintained closed. At 138, the second throttle valve is closed or maintained closed, and at 140, the requested air flow is maintained by modulating the first throttle valve.

It will be understood that no aspect of method 118 is intended to be limiting, as numerous variants of the method are contemplated. For instance, while the illustrated method shows, at 122, a determination based on the desired air-flow request which results in certain acts being taken, such a determination can be made instead based on a requested boost level or other operational parameter of the engine system. Further, in some embodiments where a check valve (e.g., check valve 62 in FIG. 3) is coupled in series with the second throttle valve, closure of the second throttle valve at 138 may be unnecessary.

Figure 9:
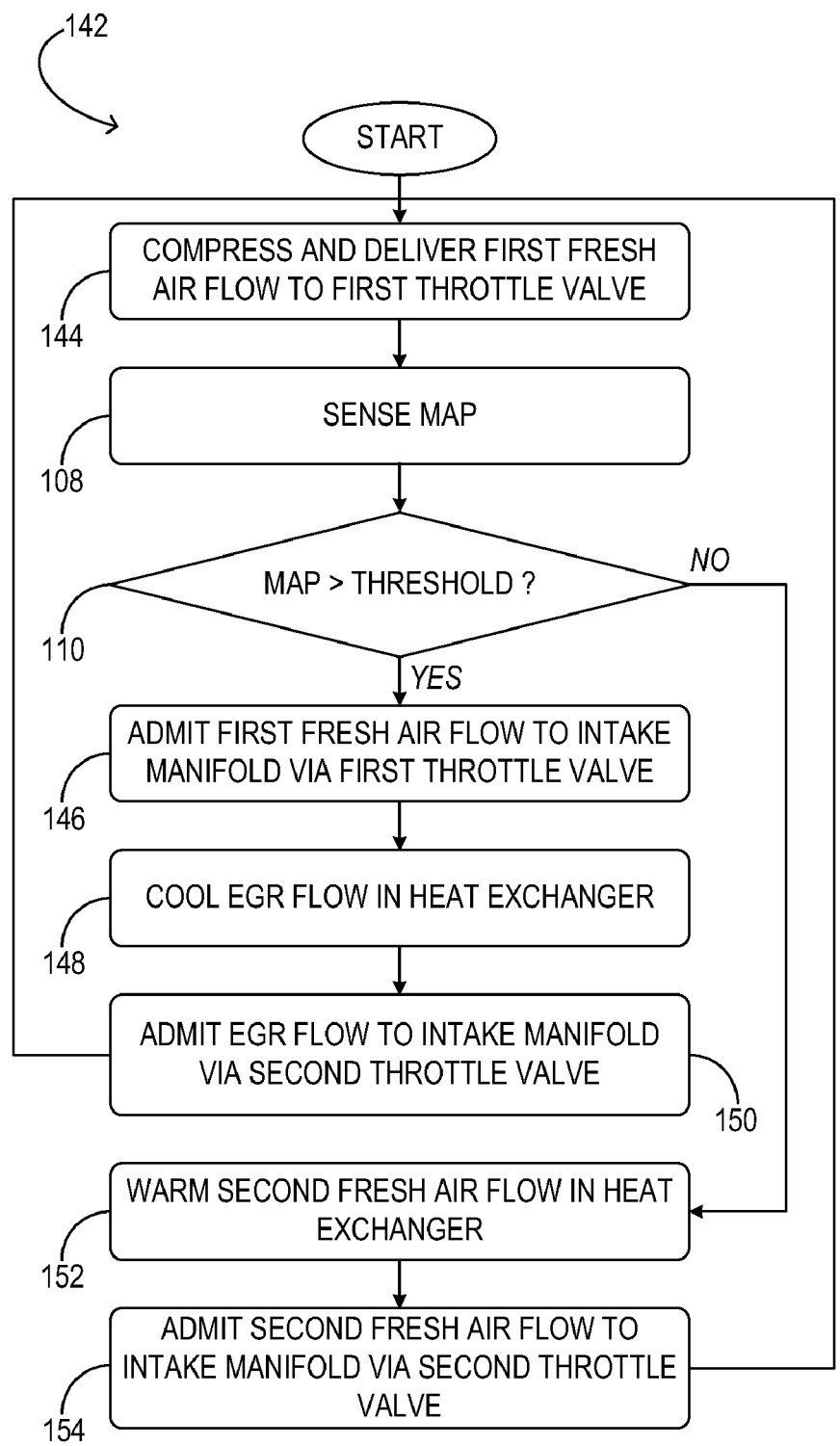

FIG. 9 illustrates a fifth example method 142 for providing intake air to an engine in a vehicle. The method may be enacted via an electronic control system (e.g., electronic control system 54) coupled to one or more sensors and electronically controlled valves, as described above. For example, method 142 may be enabled via the configuration shown in FIG. 4.

Method 142 begins at 144, where a first fresh air flow is compressed and delivered to a first throttle valve coupled to an intake manifold of the engine. The method then advances to 108, where the MAP is sensed. The method then advances to 110, where it is determined whether the MAP is greater than a threshold. If the MAP is greater than a threshold, then the method advances to 146, where the first fresh air flow is admitted to the intake manifold via the first throttle valve, to 148, where an EGR flow is cooled in a heat exchanger, and to 150, where the cooled EGR flow is admitted to the intake manifold via the second throttle valve. Following 150, execution of the method resumes at 144.

Continuing in FIG. 9, if it is determined at 110 that the MAP is not greater than the threshold, then the method advances to 152, where a second fresh air flow is warmed in the heat exchanger, and to 154, where the second fresh air flow is admitted to the intake manifold via the second throttle valve. Following 154, execution of the method resumes at 144.

As indicated above, the MAP may increase as engine load increases, and decrease as engine load decreases. Accordingly, the threshold identified above may define a higher engine-load condition and a lower engine-load condition. During the higher engine-load condition, compressed fresh air is delivered to the intake manifold via the first throttle valve while cooled, EGR is delivered to the intake manifold via the second throttle valve. During the lower engine-load condition, warmed fresh air is delivered to the intake manifold via the second throttle valve.

Further, in one embodiment, the second fresh air flow may be switchably admitted to the heat exchanger via a control valve; the control valve may be closed during the higher engine-load condition and opened during the lower engine-load condition. Accordingly, abrupt transitioning from the higher engine-load condition to the lower engine-load condition may comprise releasing compressed air stored upstream of the first throttle valve through a check valve. In this manner, the release of the stored compressed air is responsive to an opening of the control valve.

In one embodiment, the first throttle valve may be held closed during the lower engine-load condition. In this manner, the second throttle valve may be used to control intake air flow to the engine during the lower engine-load condition, and to control an EGR ratio for the engine during the higher engine-load condition.

Various extensions of method 142 are contemplated as well. In one embodiment, for example, based on the configuration shown in FIG. 4, opening first throttle valve 28, second throttle valve 60, and control valve 70 may be used to relieve excess boost pressure.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system. It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A method for providing intake air to an engine in a vehicle during a higher engine-load condition and during a lower engine-load condition, comprising:
   forming a mixture of fresh air and treated exhaust, the treated exhaust drawn from an exhaust flow of the engine downstream of an exhaust-aftertreatment catalyst;
   compressing the mixture upstream of a first throttle valve coupled to an intake manifold of the engine;
   during the higher engine-load condition, admitting the mixture to the intake manifold via the first throttle valve; and
   during the lower engine-load condition, admitting fresh air to the intake manifold via a second throttle valve coupled to the intake manifold of the engine.

2. The method of claim 1, further comprising, during an intermediate engine-load condition where an engine load is higher than in the lower engine-load condition but lower than in the higher engine-load condition, admitting the mixture to the intake manifold via the first throttle valve and admitting fresh air to the intake manifold via the second throttle valve.

3. The method of claim 1, wherein admitting the mixture to the intake manifold via the first throttle valve comprises holding the second throttle valve closed.

4. The method of claim 1, wherein admitting fresh air to the intake manifold via the second throttle valve comprises holding the first throttle valve closed.

5. The method of claim 1, further comprising providing to the compressor a substantially fixed proportion of treated exhaust relative to fresh air during the higher and lower engine-load conditions.

6. The method of claim 1, wherein the proportion of treated exhaust relative to fresh air in the intake air provided to the engine is determined by the relative degree of opening of the first and second throttle valves.

7. The method of claim 1, wherein substantially all of the intake air provided to the engine during idle is drawn through the second throttle valve.

8. The method of claim 1, wherein the higher engine-load condition corresponds to a higher manifold air-pressure range, and the lower engine-load condition corresponds to a lower manifold air-pressure range.

9. A system for providing intake air to an engine in a vehicle during a higher engine-load condition and during a lower engine-load condition, the system comprising:
   an intake manifold coupled to first and second throttle valves, the first throttle valve configured to open during the higher engine-load condition, and the second throttle valve configured to open during the lower engine-load condition to admit fresh air to the intake manifold;
   a compressor configured to compress a mixture of fresh air and treated exhaust and to deliver the mixture upstream of the first throttle valve, the treated exhaust drawn from an exhaust flow of the engine downstream of an exhaust-aftertreatment catalyst via an EGR conduit; and
   an EGR valve coupled into the EGR conduit, upstream of the compressor and downstream of the exhaust-aftertreatment catalyst, and configured to regulate how much treated exhaust is mixed into the fresh air.

10. The system of claim 9, wherein the EGR valve is configured to provide a substantially equal proportion of fresh air and treated exhaust during the higher engine-load condition and during the lower engine-load condition.

11. The system of claim 9, further comprising an air cleaner coupled upstream of the compressor, wherein the second throttle valve is coupled downstream of the air cleaner and upstream of the compressor.

12. The system of claim 9, further comprising a charge-air cooler coupled downstream of the compressor and upstream of the first throttle valve.

13. The system of claim 9, wherein the exhaust-aftertreatment catalyst comprises a NOX-reduction catalyst.

14. The system of claim 9, further comprising a soot filter, wherein the treated exhaust is drawn from the exhaust flow of the engine further downstream of the soot filter.

15. A method for controlling an engine with exhaust gas recirculation (EGR), comprising:
   directing the EGR from exhaust downstream of an exhaust-aftertreatment catalyst to mix with fresh air upstream of an intake compressor;
   admitting the mixed EGR and fresh air to an intake manifold via a first throttle valve; and
   adjusting an amount of uncompressed fresh air admitted to the intake manifold via a second throttle valve based on boost level provided by an intake compressor.

16. The method of claim 15, wherein adjusting the amount of uncompressd fresh air comprises reducing an opening of the second throttle valve as the boost increases, and increasing the opening of the second throttle valve as the boost level decreases.

17. The method of claim 15, further comprising reducing an opening of the first throttle valve as the boost decreases, and increasing the opening of the first throttle valve as the boost level increases.

18. The method of claim 15, further comprising providing the intake compressor a substantially fixed proportion of EGR relative to fresh air independent of the boost level.

19. The method of claim 15, wherein adjusting the amount of uncompressed fresh air comprises increasing the opening of the second throttle valve during TIP-out conditions of the engine.

20. The method of claim 15, further comprising reducing an opening of the first throttle valve during TIP-out conditions of the engine.

* * * * *